(12) United States Patent
Uchida et al.

(10) Patent No.: US 12,530,429 B2
(45) Date of Patent: Jan. 20, 2026

(54) DETERMINATION APPARATUS, DETERMINATION METHOD, AND NON-TRANSITORY COMPUTER READABLE MEDIUM

(71) Applicant: Yokogawa Electric Corporation, Tokyo (JP)

(72) Inventors: Yukihiro Uchida, Tokyo (JP); Kenji Oishi, Tokyo (JP); Hideo Uemura, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 18/314,122

(22) Filed: May 8, 2023

(65) Prior Publication Data

US 2023/0376565 A1 Nov. 23, 2023

(30) Foreign Application Priority Data

May 19, 2022 (JP) .................................. 2022-082652

(51) Int. Cl.
*G06F 16/50* (2019.01)
*G06F 3/06* (2006.01)
*G06F 17/40* (2006.01)

(52) U.S. Cl.
CPC ............ *G06F 17/40* (2013.01); *G06F 3/0679* (2013.01); *G06F 16/50* (2019.01); *G06F 2201/835* (2013.01)

(58) Field of Classification Search
CPC ............. G06F 17/40; G06F 3/0679; G06F 2201/835; G06F 16/50; G06F 16/53;

(Continued)

(56) References Cited

U.S. PATENT DOCUMENTS 6,182,725 B1 * 2/2001 Sorvik .................. A01G 23/08
144/357
8,189,877 B2 * 5/2012 Asner ...................... G06T 7/00
382/100

(Continued)

FOREIGN PATENT DOCUMENTS

CN 112348812 A 2/2021
JP 2016212833 A 12/2016

(Continued)

OTHER PUBLICATIONS

Extended European Search Report for counterpart European Application No. 23172766.0, issued by the European Patent Office on Oct. 5, 2023.

(Continued)

*Primary Examiner* — Michael Pham

(57) ABSTRACT

Provided is a determination apparatus including a planning data acquisition unit configured to acquire planning data representing a logging plan for logging of standing timber for a target area, a first image data acquisition unit configured to acquire first image data representing a first image captured before the logging for the target area, a second image data acquisition unit configured to acquire second image data representing a second image captured after the logging for the target area, a determination unit configured to perform a determination on whether the logging is appropriate or inappropriate based on the planning data, the first image data, and the second image data, and an output unit configured to perform an output according to a result of the determination.

14 Claims, 6 Drawing Sheets

(58) Field of Classification Search
CPC .... G06F 16/532; G06F 16/535; G06F 16/538; G06F 16/55; G06Q 10/02; G06Q 10/08; G06Q 30/00; G06Q 10/04; G06Q 10/103; G06Q 50/02; G06Q 50/00; G06V 20/188
USPC .......................................................... 707/705
See application file for complete search history.

(56) References Cited

U.S. PATENT DOCUMENTS

| | | | |
|---|---|---|---|
| 11,074,447 B1* | 7/2021 | Fox | G01V 8/02 |
| 11,614,855 B2* | 3/2023 | Geis | G06Q 10/06 |
| | | | 715/765 |
| 2003/0007668 A1 | 1/2003 | Kotake | |
| 2005/0087110 A1 | 4/2005 | Kobayashi | |
| 2013/0211721 A1* | 8/2013 | Parisa | G06V 10/811 |
| | | | 702/2 |
| 2013/0235205 A1* | 9/2013 | Lappalainen | G06Q 50/02 |
| | | | 348/148 |
| 2016/0292626 A1* | 10/2016 | Green | G06Q 50/02 |
| 2023/0102406 A1* | 3/2023 | Veronesi | G06N 3/084 |
| | | | 702/2 |
| 2023/0305684 A1* | 9/2023 | Geis | A01G 23/00 |

FOREIGN PATENT DOCUMENTS

| | | |
|---|---|---|
| JP | 2020112887 A | 7/2020 |
| WO | 2012069698 A1 | 5/2012 |

OTHER PUBLICATIONS

Office Action issued for counterpart Japanese Application No. 2022-082652, transmitted from the Japanese Patent Office on Apr. 1, 2025.

Japan Forestry Research Institute Co., Ltd., Manual for Municipal Administrative Procedures Concerning the System for Notification of Tree Cutting and Reforestation After Tree Cutting, Forest Planning Business Handbook—2019 Edition-, May 15, 2020, p. 823-859.

Hara Masanao, Remote Sensing and Its Market, Video Information, Jul. 1, 1995, p. 51-59, vol. 27 No. 31, Industrial Development Organization of Japan, Co., Ltd.

* cited by examiner

REGISTRATION FORM OF LOGGING

YEAR MONTH DAY

TO MAYOR OF MUNICIPALITY

APPLICANT :
ADDRESS :
CONTACT INFORMATION :

I WOULD LIKE TO LOG STANDING TIMBER IN FOREST AS FOLLOWS, SO I AM SUBMITTING REGISTRATION FORM PURSUANT TO PROVISIONS OF ARTICLE 10-8, PARAGRAPH 1 OF FOREST ACT.

1  LOCATION SITE OF FOREST

| CITY TOWN COUNTY VILLAGE | LARGE VILLAGE SECTION | VILLAGE SECTION | LOT NUMBER |
|---|---|---|---|
| | | | |

2  LOGGING PLAN

| LOGGING AREA | | | | ha |
|---|---|---|---|---|
| LOGGING METHOD | FINAL CUTTING (CLEARCUTTING, SELECTIVE CUTTING), THINNING | LOGGING RATE | | % |
| LOGGING TREE SPECIES | | | | |
| LOGGING AGE | MINIMUM FOREST AGE | | MAXIMUM FOREST AGE | |
| LOGGING PERIOD | TIME OF COMMENCEMENT | | TIME OF TERMINATION | |

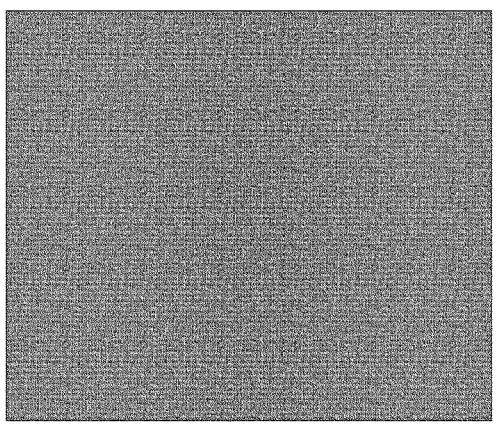 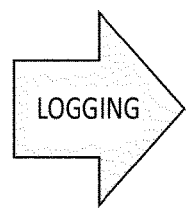 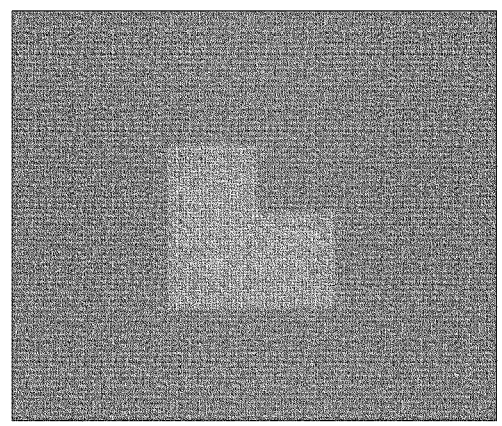
FIG.3

DETERMINATION APPARATUS, DETERMINATION METHOD, AND NON-TRANSITORY COMPUTER READABLE MEDIUM

The contents of the following Japanese patent application(s) are incorporated herein by reference:
NO. 2022-082652 filed in JP on May 19, 2022

BACKGROUND

1. Technical Field

The present invention relates to a determination apparatus, a determination method, and a non-transitory computer readable medium.

2. Related Art

Patent document 1 describes "timber information DB13A has at least . . . a permit field 114 in which a type of a permit related to logging or the like is stored, and a permit number field 115 in which a permit number for identifying the permit is stored".

LIST OF CITED REFERENCES

Patent Document

Patent document 1: Japanese Patent Application Publication No. 2016-212833

SUMMARY

According to a first aspect of the present invention, there is provided a determination apparatus.

The determination apparatus includes a planning data acquisition unit configured to acquire planning data representing a logging plan for logging of standing timber for a target area, a first image data acquisition unit configured to acquire first image data representing a first image captured before the logging for the target area, a second image data acquisition unit configured to acquire second image data representing a second image captured after the logging for the target area, a determination unit configured to perform a determination on whether the logging is appropriate or inappropriate based on the planning data, the first image data, and the second image data, and an output unit configured to perform an output according to a result of the determination.

The determination apparatus may further include an estimation unit configured to estimate at least any of a logging region having standing timber logged or a logging amount based on the first image data and the second image data.

In any of the determination apparatuses, the determination unit may determine that the logging is not appropriate when an area of the estimated logging region is larger than a logging area in the logging plan.

In any of the determination apparatuses, the determination unit may determine that the logging is not appropriate when the estimated logging region includes a region outside a logging section in the logging plan.

In any of the determination apparatuses, the determination unit may determine that the logging is not appropriate when the estimated logging amount is larger than a logging amount in the logging plan.

Any of the determination apparatuses may further include a specification unit configured to specify logged standing timber based on the first image data and the second image data.

In any of the determination apparatuses, the determination unit may determine that the logging is not appropriate when a tree species of the specified standing timber is different from a logging tree species in the logging plan.

In any of the determination apparatuses, the determination unit may determine that the logging is not appropriate when a forest age of the specified standing timber is below a minimum forest age in the logging plan.

In any of the determination apparatuses, the determination unit may determine that the logging is not appropriate when a forest age of the specified standing timber is above a maximum forest age in the logging plan.

In any of the determination apparatuses, the first image data acquisition unit may specify first timing that is before the logging according to a time of commencement of a logging period in the logging plan, and acquire the first image data based on the first timing.

In any of the determination apparatuses, the second image data acquisition unit may specify second timing that is after the logging according to a time of termination of a logging period in the logging plan, and acquire the second image data based on the second timing.

In any of the determination apparatuses, the first image and the second image may be satellite images.

In any of the determination apparatuses, the satellite images may be SAR images.

In any of the determination apparatuses, the output unit may transmit a message according to the result of the determination by setting contact information in the logging plan as a destination.

According to a second aspect of the present invention, there is provided a determination method. The determination method includes acquiring planning data representing a logging plan for logging of standing timber for a target area, acquiring first image data representing a first image captured before the logging for the target area, acquiring second image data representing a second image captured after the logging for the target area, performing a determination on whether the logging is appropriate or inappropriate based on the planning data, the first image data, and the second image data, and performing an output according to a result of the determination.

According to a third aspect of the present invention, there is provided a non-transitory computer readable medium having recorded thereon a determination program. The determination program is executed by a computer, and causes the computer to function as a planning data acquisition unit configured to acquire planning data representing a logging plan for logging of standing timber for a target area, a first image data acquisition unit configured to acquire first image data representing a first image captured before the logging for the target area, a second image data acquisition unit configured to acquire second image data representing a second image captured after the logging for the target area, a determination unit configured to perform a determination on whether the logging is appropriate or inappropriate based on the planning data, the first image data, and the second image data, and an output unit configured to perform an output according to a result of the determination.

The summary clause does not necessarily describe all necessary features of the embodiments of the present invention. The present invention may also be a sub-combination of the features described above.

BRIEF DESCRIPTION OF THE DRAWINGS

FIG. 2 illustrates an example of a registration form of logging.

FIG. 3 illustrates examples of a first image and a second image.

DESCRIPTION OF EXEMPLARY EMBODIMENTS

Hereinafter, the present invention will be described by way of embodiments of the invention, but the following embodiments do not limit the invention according to the claims. In addition, not all of the combinations of features described in the embodiments are essential to solving means of the invention.

Figure 1:
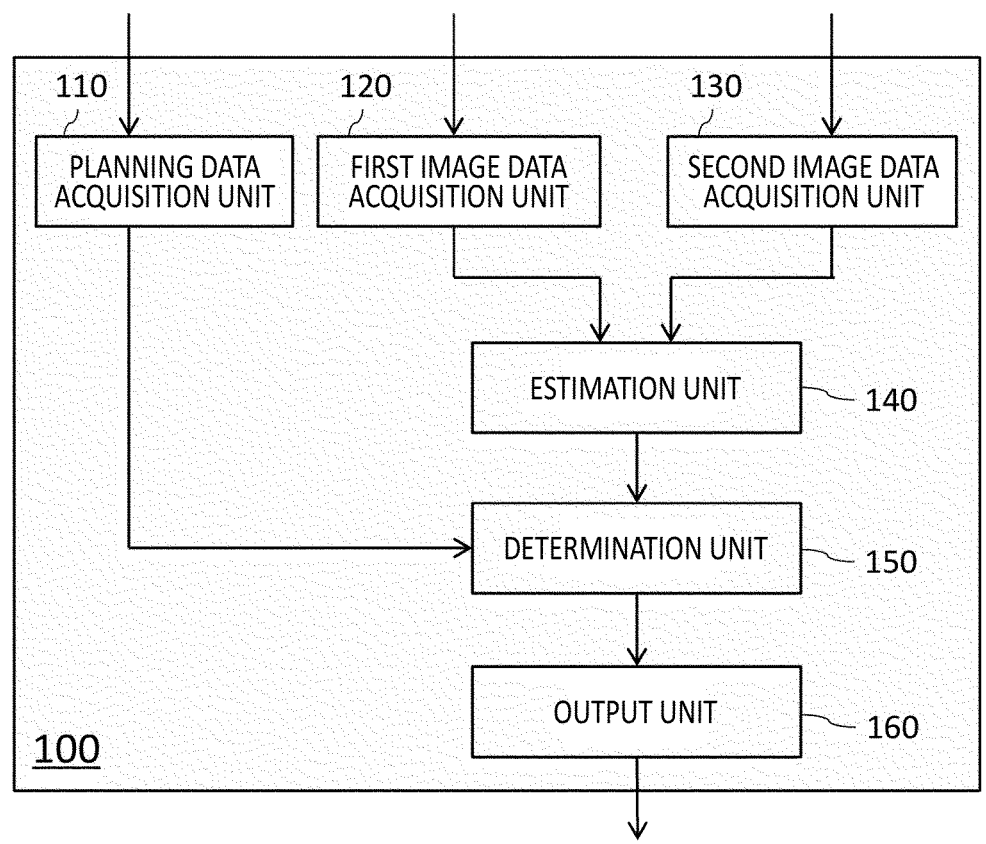
FIG. 1 illustrates an example of a block diagram of a determination apparatus 100 according to the present embodiment.

FIG. 1 illustrates an example of a block diagram of a determination apparatus 100 according to the present embodiment. The determination apparatus 100 according to the present embodiment is configured to acquire planning data representing a logging plan and data of images captured before and after logging. Then, the determination apparatus 100 according to the present embodiment is configured to determine whether the logging is appropriate or inappropriate based on these pieces of data and perform an output according to a determination result.

The determination apparatus 100 may be a computer such as a personal computer (PC), a tablet type computer, a smartphone, a workstation, a server computer or a general-purpose computer, or may be a computer system obtained by connecting a plurality of computers. Such a computer system is also a computer in a broad sense. The determination apparatus 100 may also be implemented by one or more virtual computer environments that can be executed in the computer. Instead of this, the determination apparatus 100 may be a dedicated computer designed to determine whether the logging is appropriate or inappropriate or may be dedicated hardware achieved by dedicated circuitry. In addition, when the determination apparatus 100 can be connected to the Internet, the determination apparatus 100 may also be implemented by cloud computing.

The determination apparatus 100 includes a planning data acquisition unit 110, a first image data acquisition unit 120, a second image data acquisition unit 130, an estimation unit 140, a determination unit 150, and an output unit 160. Note that a configuration may be adopted where these blocks are functional blocks that are respectively functionally separated, and do not necessarily need to match with actual device configurations. That is, in the present drawing, a configuration may be adopted where a unit illustrated as one block does not necessarily need to be configured by one device. In addition, in the present drawing, a configuration may be adopted where units illustrated as separate blocks do not necessarily need to be configured by separate devices.

The planning data acquisition unit 110 is configured to acquire planning data representing a logging plan for logging of standing timber for a target area. When a forest owner or the like is to perform logging of standing timber in a forest, the forest owner or the like has a duty to submit a logging plan in advance. For example, the planning data acquisition unit 110 may acquire planning data based on such a submission. The planning data acquisition unit 110 supplies the acquired planning data to at least the determination unit 150.

The first image data acquisition unit 120 is configured to acquire first image data representing a first image which is captured before the logging for the target area. For example, such a first image may be selected from archive images, or may be newly captured. The first image data acquisition unit 120 supplies the acquired first image data to the estimation unit 140.

The second image data acquisition unit 130 is configured to acquire second image data representing a second image captured after the logging for the target area. For example, such a second image may also be selected from archive images, or may also be newly captured. The second image data acquisition unit 130 supplies the acquired second image data to the estimation unit 140.

The estimation unit 140 is configured to estimate at least any of a logging region having standing timber logged or a logging amount based on the first image data and the second image data. The estimation unit 140 is configured to detect a variation between the first image and the second image based on the first image data and the second image data, for example. Then, the estimation unit 140 estimates at least any of the logging region or the logging amount according to the detected variation. The estimation unit 140 supplies estimated information to the determination unit 150.

The determination unit 150 is configured to determine whether the logging is appropriate or inappropriate based on the planning data, the first image data, and the second image data. The determination unit 150 determines whether the logging is appropriate or inappropriate based on, for example, the planning data acquired by the planning data acquisition unit 110, and the information estimated by the estimation unit 140 based on the first image data and the second image data. The determination unit 150 supplies a result of the determination to the output unit 160.

The output unit 160 is configured to perform an output according to the result of the determination by the determination unit 150. In this manner, the determination apparatus 100 according to the present embodiment determines whether the logging is appropriate or inappropriate based on the planning data and the image data, and performs an output according to the determination result. Each of examples of the planning data and the image data acquired upon the determination on whether the logging is appropriate or inappropriate by such a determination apparatus 100 will be specifically described.

FIG. 2 illustrates an example of a registration form of logging. According to Forestry Agency that is an administrative organization of Ministry of Agriculture, Forestry and Fisheries, when logging of standing timber in a forest is to be performed, a forest owner or a person who has purchased the standing timber has a duty to submit a logging plan to a mayor of municipality where the logging forest is located during a period 90 days to 30 days prior to a starting date of the logging. Accordingly, the determination apparatus 100 may acquire the planning data representing the logging plan based on such a registration form, for example.

For the registration form of logging, its format may be prescribed by Ministry of Agriculture, Forestry and Fisheries Notification, or its format may be prescribed by each municipality. As illustrated in the present drawing, fields for filling in a name, an address, and contact information of an applicant may be provided in the registration form of logging. In addition, a field for filling in a location site of a forest that becomes a subject of logging of standing timber may be provided in the registration form of logging. In addition, a field for filling in a logging plan, more specifically, a logging area, a logging method, a logging rate, a logging tree species, a logging age (a minimum forest age and a maximum forest age), and a logging period (a time of commencement and a time of termination) may be provided in the registration form of logging. The determination apparatus 100 may acquire, as the planning data, at least one of these items provided in the registration form of logging.

FIG. 3 illustrates examples of the first image and the second image. The first image captured before the logging for the target area is illustrated on a left of this drawing. On the other hand, the second image captured after the logging for the target area is illustrated on the right of this drawing. When the left of this drawing is compared with the right of this drawing, it is found that a color varies in an L-shaped region in a central part of the image. This represents that standing timber has been logged in the L-shaped region. In this manner, the first image and the second image may be various images with which the logging of the standing timber can be detected as a variation of the images by comparing those images with each other.

As an example, the first image and the second image may be satellite images. With this configuration, the determination apparatus 100 can determine whether the logging is appropriate or inappropriate from eyes of surveillance from the space. In particular, such a satellite image may be a synthetic aperture radar (SAR) image. The SAR image is a radar image using microwave that is one of radio waves. Microwave of an SAR satellite can transmit through a cloud, and solar light is not required for observation. Thus, observation can be performed in all weather, and nighttime observation can also be performed. With this configuration, the determination apparatus 100 can acquire the images before and after the logging any time, and also upon the comparison between the first image and the second image, a variation of the images due to a factor other than the logging (for example, a difference of the weather or capturing time) can be reduced. For example, the determination apparatus 100 may acquire data representing such a first image and data representing such a second image as the first image data and the second image data.

However, the configuration is not limited to this. The first image and the second image may be other satellite images different from the SAR images, and may be, for example, images captured from an aircraft, a drone, or the like other than the satellite images. The determination apparatus 100 may decide which types of images to be used as the first image and the second image by taking into account a size or a location of the target area, an image unit price, or the like.

The determination apparatus 100 determines whether the logging is appropriate or inappropriate based on such planning data and image data, for example, and performs the output according to the determination result. An example of such a determination method will be specifically described by using a flow.

Figure 4:
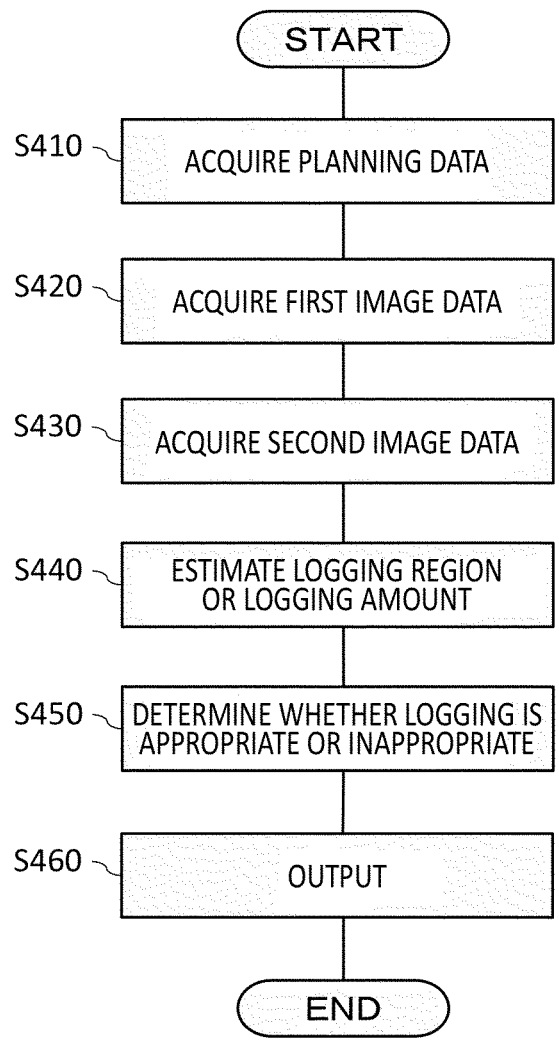
FIG. 4 illustrates an example of a flow for the determination apparatus 100 according to the present embodiment to determine whether the logging is appropriate or inappropriate.

FIG. 4 illustrates an example of a flow for the determination apparatus 100 according to the present embodiment to determine whether logging is appropriate or inappropriate. In step S410, the determination apparatus 100 acquires planning data. For example, the planning data acquisition unit 110 acquires planning data representing a logging plan for logging of standing timber for a target area. At this time, the planning data acquisition unit 110 may acquire the planning data based on a registration form of logging as illustrated in FIG. 2, for example. As an example, the planning data acquisition unit 110 may receive, via a network, a file in which the registration form of logging has been saved. Then, when the acquired file is saved in a textual format, the planning data acquisition unit 110 may read a text filled in each item from the received file, and acquire those as the planning data. At this time, the planning data acquisition unit 110 may read texts filled in all the items of the name, the address, and the contact information of the applicant, the location site of the forest, the logging area, the logging method, the logging rate, the logging tree species, the logging age (the minimum forest age and the maximum forest age), and the logging period (the time of commencement and the time of termination), and acquire those as the planning data.

Note that in the above description, a case where the receive file is saved in a textual format has been described as an example. However, when the received file is saved in an image format, the planning data acquisition unit 110 may read a text by character recognition of the received file by an optical character reader (OCR) or the like, for example. In addition, in the above description, a case where the planning data acquisition unit 110 obtains, by communication via a network, the file in which the registration form of logging has been saved has been described as an example, but the configuration is not limited to this. The planning data acquisition unit 110 may obtain such a file by reading the file from various types of memory devices.

In addition, the planning data acquisition unit 110 can acquire planning data via a user input. For example, the planning data acquisition unit 110 may prompt a user to fill in each item by displaying the registration form of logging as illustrated in FIG. 2 on a monitor. In response to this, the user may fill in each item. For example, in this manner, the planning data acquisition unit 110 may acquire data filled in by the user as the planning data. The planning data acquisition unit 110 supplies the acquired planning data to at least the determination unit 150. At this time, the planning data acquisition unit 110 may supply a part or whole of the acquired planning data to another functional unit other than the determination unit 150.

In step S420, the determination apparatus 100 acquires the first image data. For example, the first image data acquisition unit 120 acquires the first image data representing the first image captured before the logging for the target area. At this time, when a part or whole of planning data is supplied from the planning data acquisition unit 110, the first image data acquisition unit 120 may specify, as first timing, any timing before the time of commencement of the logging period which is represented in the planning data. Such first timing is more preferable when the first timing is before the time of commencement of the logging period and is also timing close to the time of commencement of the logging period. Then, the first image data acquisition unit 120 may select, as the first image, an image captured at the first timing for the target area from an archive image. Then, the first image data acquisition unit 120 may acquire the first image data representing the first image via a network or various types of memory devices. Note that when a desired image is not archived, the first image data acquisition unit 120 may transmit a capturing request message for capturing the target area at the first timing, and acquire the first image data by receiving the first image data representing the newly captured first image. For example, in this manner, the first image data acquisition unit 120 may specify the first timing that is before the logging according to the time of commencement of the logging period in the logging plan, and acquire the first image data based on the first timing. The first image data acquisition unit 120 supplies the acquired first image data to the estimation unit 140.

In step S430, the determination apparatus 100 acquires the second image data. For example, the second image data acquisition unit 130 acquires the second image data representing the second image captured after the logging for the target area. At this time, when a part or whole of planning data is supplied from the planning data acquisition unit 110, the second image data acquisition unit 130 may specify, as second timing, any timing after the time of termination of the logging period which is represented in the planning data. Such second timing is more preferable when the second timing is after the time of termination of the logging period and is also timing close to the time of termination of the logging period. Then, the second image data acquisition unit 130 may select, as the second image, an image captured at the second timing for the target area from an archive image. Then, the second image data acquisition unit 130 may acquire the second image data representing the second image via a network or various types of memory devices. Note that when a desired image is not archived, the second image data acquisition unit 130 may transmit a capturing request message for capturing the target area at the second timing, and acquire the second image data by receiving the second image data representing the newly captured second image. For example, in this manner, the second image data acquisition unit 130 may specify the second timing that is after the logging according to the time of termination of the logging period in the logging plan, and acquire the second image data based on the second timing. The second image data acquisition unit 130 supplies the acquired second image data to the estimation unit 140.

In step S440, the determination apparatus 100 estimates a logging region or a logging amount. For example, the estimation unit 140 estimates at least any of the logging region where the standing timber has been logged or the logging amount based on the first image data acquired in step S420 and the second image data acquired in step S430. At this time, for example, the estimation unit 140 may compare the first image with the second image pixel by pixel, and detect a pixel with a variation which is at a predetermined threshold or more. Then, the estimation unit 140 may estimate, as the logging region, a region obtained by combining detected pixels.

In addition, the estimation unit 140 may estimate the logging rate from a degree of variation in the first image and the second image. At this time, the estimation unit 140 may use a table in which a relationship between the degree of variation in the images and the logging rate is previously associated, or may use a model having been subjected to machine learning so as to output the logging rate in response to an input of the degree of variation in the images. Then, the estimation unit 140 may estimate the logging amount based on (for example, by multiplication of) the estimated area of the logging region and the logging rate.

Note that in the above description, a case where the estimation unit 140 compares the first image with the second image pixel by pixel has been described as an example, but the configuration is not limited to this. The estimation unit 140 may divide the first image and the second image into a grid shape by using latitude lines and longitude lines, and compare the first image with the second image grid by grid. The estimation unit 140 supplies the estimated information to the determination unit 150.

In step S450, the determination apparatus 100 determines whether logging is appropriate or inappropriate. For example, the determination unit 150 determines whether the logging is appropriate or inappropriate based on the planning data acquired in step S410 and the information estimated in step S440 based on the first image data acquired in step S420 and the second image data acquired in step S430.

As an example, the determination unit 150 may determine that the logging is not appropriate when the area of the logging region which is estimated in step S440 is larger than the logging area in the logging plan which is represented in the planning data acquired in step S410. On the other hand, the determination unit 150 may determine that the logging is appropriate when the estimated area of the logging region is the same as or smaller than the logging area in the logging plan.

In addition, the determination unit 150 may determine that the logging is not appropriate when the logging region estimated in step S440 includes a region outside a logging section in the logging plan which is represented in the planning data acquired in step S410 (as an example, a region other than the location site of the forest). On the other hand, the determination unit 150 may determine that the logging is appropriate when all the estimated logging region is inside the logging section in the logging plan.

The determination unit 150 may determine that the logging is not appropriate when the logging amount estimated in step S440 is larger than the logging amount in the logging plan which is represented in the planning data acquired in step S410 (as an example, the logging area×the logging rate). On the other hand, the determination unit 150 may determine that the logging is appropriate when the estimated logging amount is the same as or smaller than the logging amount in the logging plan.

For example, in this manner, the determination unit 150 can determine whether the logging is appropriate or inappropriate based on the planning data, the first image data, and the second image data. The determination unit 150 supplies a result of the determination to the output unit 160.

In step S460, the determination apparatus 100 performs an output. For example, when a part or whole of planning data is supplied from the planning data acquisition unit 110, the output unit 160 may read contact information of the applicant which is represented in the planning data. Then, the contact information may be set as a destination to transmit a result determined in step S450, that is, a message representing whether the logging is appropriate. For example, in this manner, the output unit 160 may set the contact information in the logging plan as the destination to transmit the message according to the determination result.

However, the configuration is not limited to this. The output unit 160 may transmit the message by setting contact information in another organization as the destination. Instead of, or in addition to, the transmission of the message, the output unit 160 may output the determination result through display by a monitor, may output the determination result through printing by a printer, or may output the determination result through sound by a speaker.

In recent years, importance of traceability of timber has been increased. In view of the above, up to now, registration of a logging permit in a database for managing timber has been under review. However, the logging permit is relatively easily granted once a registration form of logging is approved. In addition, many aspects of a report after the logging depend on self-assessment by a logger, and as it stands, whether the logging of standing timber is appropriately carried out is not actually checked or is checked only on a simplified manner.

In view of the above, the determination apparatus 100 according to the present embodiment is configured to determine whether the logging is appropriate or inappropriate based on planning data and image data, and perform an output according to a determination result. As a result, in accordance with the determination apparatus 100 according to the present embodiment, whether the logging of standing timber is appropriately carried out can be objectively determined based on data instead of a subjective determination by using manpower, and a result of the determination can be provided.

At this time, in accordance with the determination apparatus 100 according to the present embodiment, since a satellite image can be used as the image, even when the logging is carried out over a wide range, an image covering all the logging region can be relatively easily acquired, and also whether the logging is appropriate or inappropriate can be determined by eyes of surveillance from the space.

In addition, the determination apparatus 100 according to the present embodiment can specify the first timing and the second timing according to the logging period in the logging plan, and acquire the first image and the second image based on the corresponding timing. As a result, in accordance with the determination apparatus 100 according to the present embodiment, timing for capturing images before and after the logging can be automatically specified, and the first image and the second image can be acquired without the intermediation of manpower.

In addition, the determination apparatus 100 according to the present embodiment can determine whether the logging is appropriate or inappropriate based on at least any of the area of the logging region, the range of the logging region, or the logging amount. As a result, in accordance with the determination apparatus 100 according to the present embodiment, even when information of any of these is missing as the logging plan, whether the logging is appropriate or inappropriate can be determined based on the other information. In addition, the determination apparatus 100 according to the present embodiment can determine whether the logging is appropriate or inappropriate based on at least two or more of those pieces of information, or more preferably, all the pieces of information. As a result, in accordance with the determination apparatus 100 according to the present embodiment, a risk of erroneously determining whether the logging is appropriate or inappropriate can be reduced. Such an advantage is particularly effective when an image with a low spatial resolution such as a satellite image is used as the image.

In addition, the determination apparatus 100 according to the present embodiment can transmit a message according to the determination result by setting the contact information in the logging plan as the destination. As a result, in accordance with the determination apparatus 100 according to the present embodiment, the determination result can be automatically provided to a person who has applied for the logging.

Figure 5:
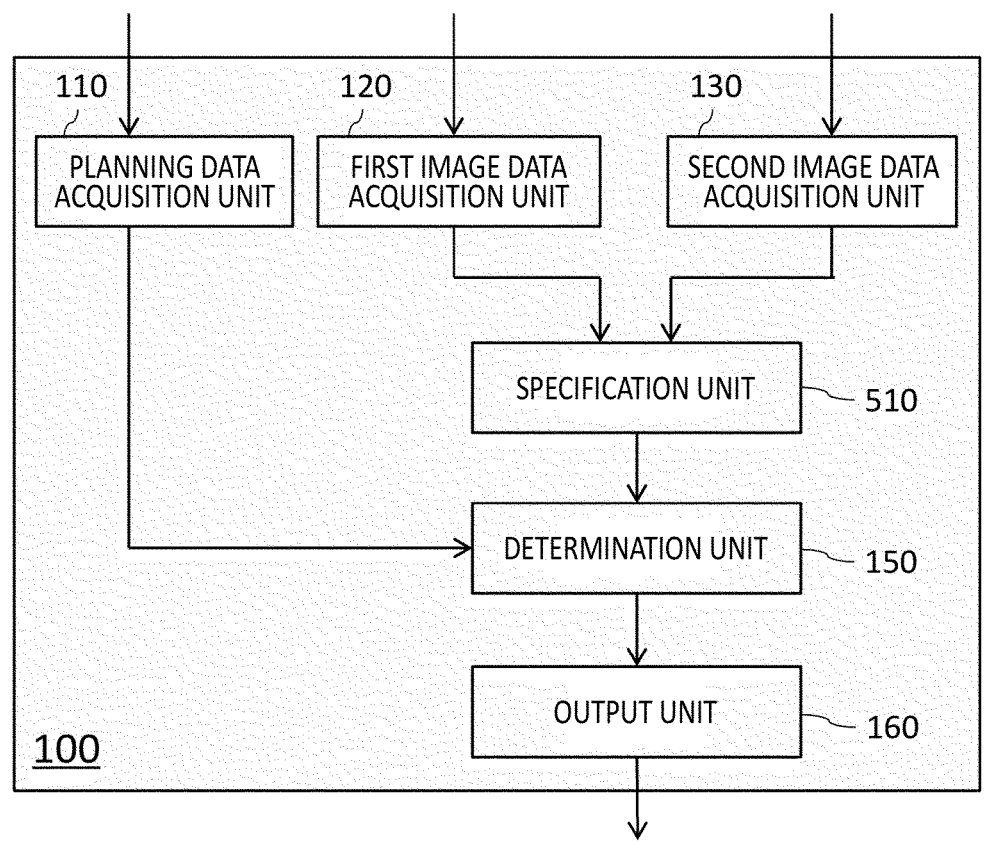
FIG. 5 illustrates an example of a block diagram of the determination apparatus 100 according to a modified example of the present embodiment.

FIG. 5 illustrates an example of a block diagram of the determination apparatus 100 according to a modified example the present embodiment. In FIG. 5, the members having same functions and configurations as those in FIG. 1 are denoted with the same reference signs, and descriptions thereof are omitted, except for differences to be described below. In the embodiment described above, a case where the determination apparatus 100 determines whether the logging is appropriate or inappropriate by considering the region and the amount of logging has been described as an example, but in the present embodiment, the determination apparatus 100 determines whether the logging is appropriate or inappropriate by considering logged standing timber. The determination apparatus 100 according to the present embodiment further includes a specification unit 510.

In the present embodiment, the first image data acquisition unit 120 supplies the acquired first image data to the specification unit 510. In addition, the second image data acquisition unit 130 supplies the acquired second image data to the specification unit 510. Note that in the present embodiment, optical images may be used as the first image and the second image to facilitate the specification of logged standing timber.

The specification unit 510 is configured to specify logged standing timber based on the first image data and the second image data. For example, the specification unit 510 can identify a tree crown of the standing timber by analyzing an image, and specify a tree species (as an example, Japanese red pine, larch, cedar, cypress, broadleaf trees, or the like) based on a spectral reflection characteristic of the tree crown. In addition, the specification unit 510 can specify a forest age of the standing timber from a tree crown diameter or a tree height. Accordingly, the specification unit 510 can specify the tree species or the forest age of the logged standing timber based on the first image data and the second image data. Note that since such a specification method is known, a detailed description thereof will be omitted herein. The specification unit 510 supplies specified information to the determination unit 150.

For example, the determination unit 150 determines whether the logging is appropriate or inappropriate based on the planning data acquired by the planning data acquisition unit 110 and the information specified by the specification unit 510 based on the first image data and the second image data.

As an example, the determination unit 150 may determine that the logging is not appropriate when the tree species of the standing timber specified by the specification unit 510 is different from the logging tree species in the logging plan. On the other hand, the determination unit 150 may determine that the logging is appropriate when the specified tree species of the standing timber is the same as the logging tree species in the logging plan.

In addition, the determination unit 150 may determine that the logging is not appropriate when the forest age of the standing timber specified by the specification unit 510 is below the minimum forest age in the logging plan. On the other hand, the determination unit 150 may determine that the logging is appropriate when the specified forest age of the standing timber is the same as or higher than the minimum forest age in the logging plan.

In addition, the determination unit 150 may determine that the logging is not appropriate when the forest age of the standing timber specified by the specification unit 510 is above the maximum forest age in the logging plan. On the other hand, the determination unit 150 may determine that the logging is appropriate when the specified forest age of the standing timber is the same as or lower than the maximum forest age in the logging plan.

For example, in this manner, the determination unit 150 may determine whether the logging is appropriate or inappropriate based on the planning data, the first image data, and the second image data. In this manner, the determination apparatus 100 according to the present embodiment can determine whether the logging is appropriate or inappropriate based on at least any of the tree species of the logged standing timber or the forest age. As a result, in accordance with the determination apparatus 100 according to the present embodiment, whether the logging is appropriate or inappropriate can be determined in light of an aspect different from the logged region or amount.

Note that in the above description, for convenience, a case where the determination apparatus 100 includes the specification unit 510 instead of the estimation unit 140 has been described as an example, but the determination apparatus 100 may include the specification unit 510 in addition to the estimation unit 140. That is, the determination apparatus 100 may determine whether the logging is appropriate or inappropriate by considering the logged standing timber in addition to the logged region or amount. As a result, in accordance with the determination apparatus 100 according to the present embodiment, aspects for determining whether the logging is appropriate or inappropriate can be increased, and missing of information in the logging plan can be more flexibly coped with, and also the risk of erroneously determining whether the logging is appropriate or inappropriate can be further reduced. Note that when whether the logging is appropriate or inappropriate is to be determined by a combination of a plurality of aspects, the determination apparatus 100 can set a weight for each aspect, and determine whether the logging is appropriate or inappropriate based on a score obtained by weighted addition of a determination result for each aspect.

Various embodiments of the present invention may be described with reference to flowcharts and block diagrams whose blocks may represent (1) steps of processes in which operations are performed or (2) sections of devices responsible for performing operations. Certain steps and sections may be implemented by dedicated circuitry, programmable circuitry supplied with computer readable instructions stored on computer readable media, and/or processors supplied with computer readable instructions stored on computer readable media. Dedicated circuitry may include digital and/or analog hardware circuits, and may include integrated circuits (IC) and/or discrete circuits. The programmable circuitry may include a reconfigurable hardware circuit including logical AND, logical OR, logical XOR, logical NAND, logical NOR, and other logical operations, a memory element such as a flip-flop, a register, a field programmable gate array (FPGA) and a programmable logic array (PLA), and the like.

A computer readable medium may include any tangible device that can store instructions to be executed by a suitable device, and as a result, the computer readable medium having instructions stored thereon includes an article of manufacture including instructions which can be executed in order to create means for performing operations specified in the flowcharts or block diagrams. Examples of the computer readable medium may include an electronic storage medium, a magnetic storage medium, an optical storage medium, an electromagnetic storage medium, a semiconductor storage medium, and the like. More specific examples of the computer readable medium may include a floppy disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a Blu-ray (registered trademark) disk, a memory stick, an integrated circuit card, and the like.

The computer readable instruction may include: an assembler instruction, an instruction-set-architecture (ISA) instruction; a machine instruction; a machine dependent instruction; a microcode; a firmware instruction; state-setting data; or either a source code or an object code written in any combination of one or more programming languages, including an object oriented programming language such as Smalltalk (registered trademark), JAVA (registered trademark), C++, or the like; and a conventional procedural programming language such as a "C" programming language or a similar programming language.

Computer readable instructions may be provided to a processor of a general-purpose computer, special purpose computer, or other programmable data processing apparatuses, or to a programmable circuitry, locally or via a local area network (LAN), wide area network (WAN) such as the Internet, or the like, to execute the computer readable instructions in order to create means for performing operations specified in the flowcharts or block diagrams. Examples of the processor include a computer processor, a processing unit, a microprocessor, a digital signal processor, a controller, a microcontroller, and the like.

Figure 6:
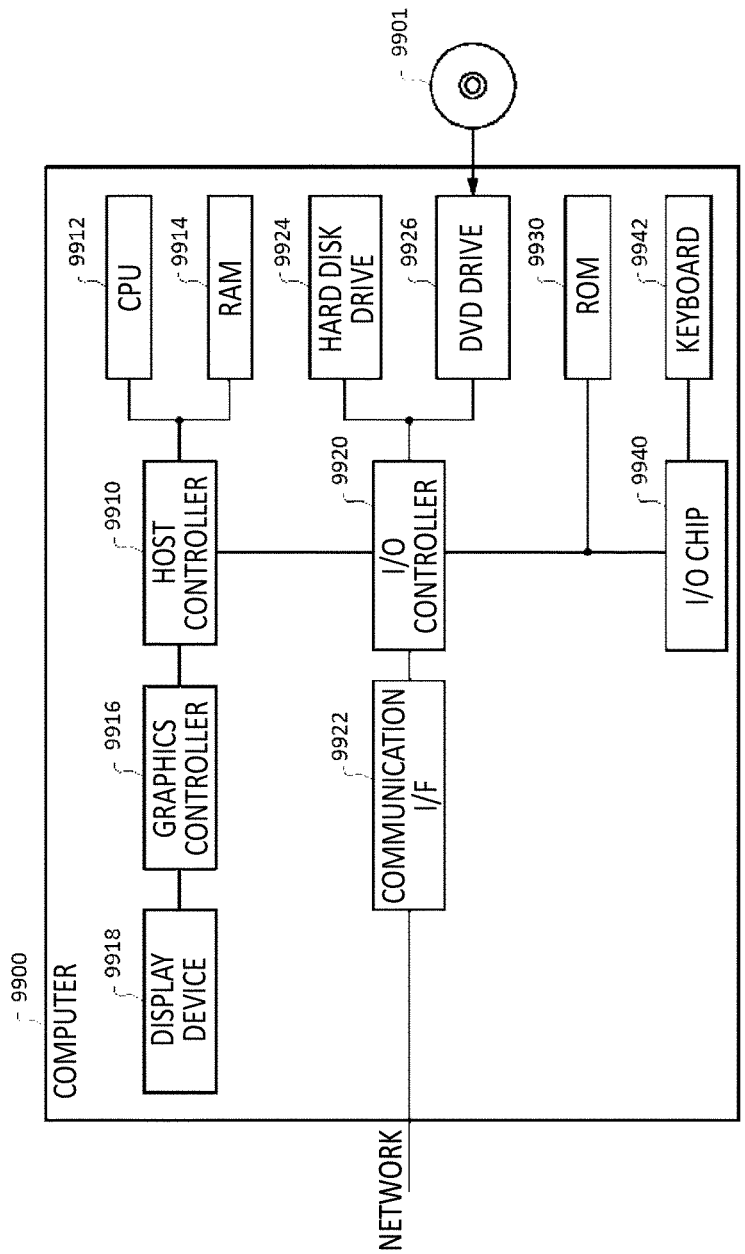
FIG. 6 illustrates an example of a computer 9900 in which a plurality of modes of the present invention may be entirely or partially embodied.

FIG. 6 illustrates an example of a computer 9900 through which a plurality of modes of the present invention may be entirely or partially embodied. A program that is installed in the computer 9900 can cause the computer 9900 to function as or execute operations associated with the apparatus according to the embodiment of the present invention or one or more sections of the apparatus, and/or cause the computer 9900 to execute the processes according to the embodiment of the present invention or steps thereof. Such a program may be executed by a CPU 9912 so as to cause the computer 9900 to execute certain operations associated with some or all of the flowcharts and the blocks in the block diagrams described herein.

The computer 9900 according to the present embodiment includes the CPU 9912, a RAM 9914, a graphics controller 9916 and a display device 9918, which are mutually connected by a host controller 9910. The computer 9900 further includes input/output units such as a communication interface 9922, a hard disk drive 9924, a DVD drive 9926 and an IC card drive, which are connected to the host controller 9910 via an input/output controller 9920. The computer also includes legacy input/output units such as a ROM 9930 and a keyboard 9942, which are connected to the input/output controller 9920 via an input/output chip 9940.

The CPU 9912 operates according to programs stored in the ROM 9930 and the RAM 9914, thereby controlling each unit. The graphics controller 9916 acquires image data generated by the CPU 9912 on a frame buffer or the like provided in the RAM 9914 or in itself, and to cause the image data to be displayed on the display device 9918.

The communication interface 9922 communicates with other electronic devices via a network. The hard disk drive 9924 stores programs and data that are used by the CPU 9912 within the computer 9900. The DVD drive 9926 reads programs or data from a DVD-ROM 9901, and to provide the hard disk drive 9924 with the programs or data via the RAM 9914. The IC card drive reads the programs and the data from the IC card, and/or writes the programs and the data to the IC card.

The ROM 9930 stores therein a boot program or the like executed by the computer 9900 at the time of activation, and/or a program depending on the hardware of the computer 9900. The input/output chip 9940 may also connect various input/output units via a parallel port, a serial port, a keyboard port, a mouse port or the like to the input/output controller 9920.

A program is provided by a computer readable medium such as the DVD-ROM 9901 or the IC card. The program is read from the computer readable medium, installed into the hard disk drive 9924, RAM 9914, ROM 9930, which are also examples of a computer readable medium, and executed by CPU 9912. The information processing described in these programs is read into the computer 9900, resulting in cooperation between a program and the above-mentioned various types of hardware resources. An apparatus or method may be constituted by realizing the operation or processing of information in accordance with the usage of the computer 9900.

For example, when communication is performed between the computer 9900 and an external device, the CPU 9912 may execute a communication program loaded onto the RAM 9914 to instruct communication processing to the communication interface 9922, based on the processing described in the communication program. The communication interface 9922, under control of the CPU 9912, reads transmission data stored on a transmission buffer region provided in a recording medium such as the RAM 9914, the hard disk drive 9924, DVD-ROM 9901, or the IC card, and transmits the read transmission data to a network or writes reception data received from a network to a reception buffer region or the like provided on the recording medium.

In addition, the CPU 9912 may cause all or a necessary portion of a file or a database to be read into the RAM 9914, wherein the file or the database has been stored in an external recording medium such as the hard disk drive 9924, the DVD drive 9926 (DVD-ROM 9901), the IC card, etc., and perform various types of processing on the data on the RAM 9914. The CPU 9912 then writes back the processed data to the external recording medium.

Various types of information such as various types of programs, data, tables, and databases may be stored in a recording medium and subjected to information processing. The CPU 9912 may perform various types of processing on the data read from the RAM 9914, which includes various types of operations, information processing, condition judging, conditional branch, unconditional branch, search/replacement of information, etc., as described throughout this disclosure and designated by an instruction sequence of programs, and writes the result back to the RAM 9914. In addition, the CPU 9912 may search for information in a file, a database, etc., in the recording medium. For example, when a plurality of entries, each having an attribute value of a first attribute associated with an attribute value of a second attribute, are stored in the recording medium, the CPU 9912 may search for an entry whose attribute value of the first attribute matches the condition a designated condition, from among the plurality of entries, and read the attribute value of the second attribute stored in the entry, thereby obtaining the attribute value of the second attribute associated with the first attribute satisfying the predetermined condition.

The above described program or software modules may be stored in the computer readable medium on or near the computer 9900. In addition, a recording medium such as a hard disk or a RAM provided in a server system connected to a dedicated communication network or the Internet can be used as the computer readable medium, thereby providing the program to the computer 9900 via the network.

While the embodiments of the present invention have been described, the technical scope of the present invention is not limited to the above described embodiments. It is apparent to persons skilled in the art that various alterations and improvements can be added to the above described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, specification, or drawings can be performed in any order as long as the order is not indicated by "prior to," "before," or the like and as long as the output from a previous process is not used in a later process. Even if the process flow is described using phrases such as "first" or "next" in the claims, specification, or drawings for convenience, it does not necessarily mean that the process must be performed in this order.

EXPLANATION OF REFERENCES

100: determination apparatus; 110: planning data acquisition unit; 120: first image data acquisition unit; 130: second image data acquisition unit; 140: estimation unit; 150: determination unit; 160: output unit; 510: specification unit; 9900: computer; 9901: DVD-ROM; 9910: host controller; 9912: CPU; 9914: RAM; 9916: graphics controller; 9918: display device; 9920: input/output controller; 9922: communication interface; 9924: hard disk drive; 9926: DVD drive; 9930: ROM; 9940: input/output chip; 9942: keyboard.

What is claimed is:

1. A determination apparatus comprising at least one processor, wherein:
   the at least one processor acquires planning data without the intermediation of manpower representing a logging plan for logging of standing timber for a target area;
   the at least one processor acquires first image data without the intermediation of manpower representing a first image captured before the logging for the target area;
   the at least one processor acquires second image data without the intermediation of manpower representing a second image captured after the logging for the target area;
   the at least one processor determines whether the logging is appropriate or inappropriate based on the planning data, the first image data, and the second image data;
   the at least one processor outputs according to a result of the determination;
   the at least one processor estimates at least any of a logging region having standing timber logged or a logging amount based on the first image data and the second image data; and
   at least one of:
     the at least one processor determines that the logging is not appropriate when an area of the logging region that is estimated is larger than a logging area in the logging plan,
     the at least one processor determines that the logging is not appropriate when the logging region that is estimated includes a region outside a logging section in the logging plan, or
     the at least one processor determines that the logging is not appropriate when the logging amount that is estimated is larger than a logging amount in the logging plan.

2. The determination apparatus according to claim 1, wherein the at least one processor specifies a first timing that is before the logging according to a time of commencement of a logging period in the logging plan and acquires the first image data based on the first timing.

3. The determination apparatus according to claim 1, wherein the at least one processor specifies a second timing that is after the logging according to a time of termination of a logging period in the logging plan and acquires the second image data based on the second timing.

4. The determination apparatus according to claim 1, wherein the first image and the second image are satellite images.

5. The determination apparatus according to claim 4, wherein the satellite images are SAR images.

6. The determination apparatus according to claim 1, wherein the at least one processor transmits a message according to the result of the determination by setting contact information in the logging plan as a destination.

7. A determination method performed by at least one processor, comprising:
   acquiring planning data without the intermediation of manpower representing a logging plan for logging of standing timber for a target area using the at least one processor;
   acquiring first image data without the intermediation of manpower representing a first image captured before the logging for the target area using the at least one processor;
   acquiring second image data without the intermediation of manpower representing a second image captured after the logging for the target area using the at least one processor;
   performing a determination on whether the logging is appropriate or inappropriate based on the planning data, the first image data, and the second image data using the at least one processor;
   performing an output according to a result of the determination using the at least one processor;
   estimating at least any of a logging region having standing timber logged or a logging amount based on the first image data and the second image data; and
   at least one of:
      determining that the logging is not appropriate when an area of the logging region that is estimated is larger than a logging area in the logging plan,
      determining that the logging is not appropriate when the logging region that is estimated includes a region outside a logging section in the logging plan, or
      determining that the logging is not appropriate when the logging amount that is estimated is larger than a logging amount in the logging plan.

8. A non-transitory computer readable medium having recorded thereon a determination program that, when executed by a computer, causes the computer to:
   acquire planning data without the intermediation of manpower representing a logging plan for logging of standing timber for a target area;
   acquire first image data without the intermediation of manpower representing a first image captured before the logging for the target area;
   acquire second image data without the intermediation of manpower representing a second image captured after the logging for the target area;
   perform a determination on whether the logging is appropriate or inappropriate based on the planning data, the first image data, and the second image data; and
   perform an output according to a result of the determination;
   estimate at least any of a logging region having standing timber logged or a logging amount based on the first image data and the second image data; and
   at least one of:
      determine that the logging is not appropriate when an area of the logging region that is estimated is larger than a logging area in the logging plan,
      determine that the logging is not appropriate when the logging region that is estimated includes a region outside a logging section in the logging plan, or
      determine that the logging is not appropriate when the logging amount that is estimated is larger than a logging amount in the logging plan.

9. A determination apparatus comprising at least one processor, wherein:
   the at least one processor acquires planning data without the intermediation of manpower representing a logging plan for logging of standing timber for a target area;
   the at least one processor acquires first image data without the intermediation of manpower representing a first image captured before the logging for the target area;
   the at least one processor acquires second image data without the intermediation of manpower representing a second image captured after the logging for the target area;
   the at least one processor determines whether the logging is appropriate or inappropriate based on the planning data, the first image data, and the second image data;
   the at least one processor outputs according to a result of the determination;
   the at least one processor specifies logged standing timber based on the first image data and the second image data; and
   at least one of
      the at least one processor determines that the logging is not appropriate when a tree species of the specified standing timber is different from a logging tree species in the logging plan,
      the at least one processor determines that the logging is not appropriate when a forest age of the specified standing timber is below a minimum forest age in the logging plan, or
      the at least one processor determines that the logging is not appropriate when the forest age of the specified standing timber is above a maximum forest age in the logging plan.

10. The determination apparatus according to claim 9, wherein the at least one processor specifies a first timing that is before the logging according to a time of commencement of a logging period in the logging plan and acquires the first image data based on the first timing.

11. The determination apparatus according to claim 9, wherein the at least one processor specifies a second timing that is after the logging according to a time of termination of a logging period in the logging plan and acquires the second image data based on the second timing.

12. The determination apparatus according to claim 9, wherein the first image and the second image are satellite images.

13. The determination apparatus according to claim 12, wherein the satellite images are SAR images.

14. The determination apparatus according to claim 6, wherein the at least one processor transmits a message according to the result of the determination by setting contact information in the logging plan as a destination.

* * * * *